United States Patent
Yoshida et al.

[11] 3,714,321
[45] Jan. 30, 1973

[54] METHOD FOR WITHDRAWAL OF CURED TIRES FROM A PRESS FOR SHAPING AND CURING TIRES

[75] Inventors: Shoushi Yoshida; Atsuaki Iwama; Takashi Odada; Tetsuo Suda, all of Kobe, Japan

[73] Assignee: Kobe Steel, Ltd., Kobe, Japan

[22] Filed: Oct. 5, 1970

[21] Appl. No.: 78,020

[30] Foreign Application Priority Data

Oct. 2, 1970 Japan..................................44/80070

[52] U.S. Cl. .....................264/334, 264/315, 425/38
[51] Int. Cl. ...........................B29c 7/00, B29h 5/08
[58] Field of Search .........264/315, 326, 334; 425/38

[56] References Cited

UNITED STATES PATENTS

| | | | |
|---|---|---|---|
| 3,260,782 | 7/1966 | Soderquist | 264/334 |
| 3,097,394 | 7/1963 | Mallory et al. | 264/326 UX |

*Primary Examiner*—Robert F. White
*Assistant Examiner*—J. H. Silbaugh
*Attorney*—Hamilton, Renner & Kenner

[57] ABSTRACT

A method for removing a cured tire from a press for shaping and curing tires having upper and lower mold sections and a collapsible bladder having upper and lower beads. The upper bead of the cured tire and the upper bead of the bladder are spaced and a plurality of segment plates are expanded into the space between the upper bead of the cured tire and the upper bead of the bladder. The segment plates are then moved upwardly while engaging the upper bead of the cured tire to strip the cured tire from the mold and the bladder.

4 Claims, 7 Drawing Figures

METHOD FOR WITHDRAWAL OF CURED TIRES FROM A PRESS FOR SHAPING AND CURING TIRES

BACKGROUND OF THE INVENTION

The present invention relates generally to a method for withdrawing smoothly, quickly and easily a tire which has been shaped and cured in a press from the two halves or sections of a mold mounted in the press.

In a conventional type of press for shaping and curing tires, withdrawal of a tire which has been shaped and cured in the press from the two halves, one upper and the other lower, of a mold mounted in said press is performed in such a manner that the lower circular bead of the tire which is supported at the underside thereof by a bead ring associated with the lower half of the mold is moved upwardly by a thrust provided by a cylinder attached to a separate device, in order to positively strip the tire from the lower half of the mold. This practice of tire removal, however, is accompanied by the significant difficulty that, as the mold opens or the upper half of the mold moves upwardly relative to the lower half, the tire is frequently not stripped from and rises with the upper mold half despite the application of stripping agent. This result obtains because no provision is incorporated to ensure positive stripping of the tire from the rising upper mold half and the unintentional upward displacement of the tire is prevented only by adhesion to the bladder which is inside the tire and attached to the lower mold half.

This difficulty has reportedly been eliminated by an invention identified by U.S. Pat. No. 3,260,782, according to which a plurality of sector segment plates capable of being expanded to a diameter exceeding the diameter of the circular tire beads are placed between the upper and lower beads of the tire and interiorly of the bladder. Accordingly, the upper bead of the tire is stripped forcibly from the rising upper half of the mold by the expanded sector segment plates which arrest the lower bead should the tire stick to the rising upper mold half, and the lower bead of the tire from the lower half of the mold by a force resulting from the relative rising movement of the sector segment plates, the upper bead ring of the tire then being supported by the expanded sector segment plates. This type of tire stripping employing sector segment plates has the disadvantage that the stripping is adversely affected by deterioration of the rubber at the inside of the bladder producing a very unstable stripping, because of the installation of the segment plates within the bladder. This, coupled with the tendency of the material of the segment plates to early deterioration due to exposure to curing fluid causes a reduced service life, with the result that maintenance and control of the segment plates are extremely troublesome.

SUMMARY OF THE INVENTION

A primary object of the invention is to provide a method for smoothly and positively stripping a cured tire from both upper and lower halves of a mold in a press for shaping and curing tires having a collapsible bladder.

Another object of the present invention is to provide a mechanism for achieving the object of the present invention described above with reliable performance and long service life accompanied by ease of maintenance and overhaul.

A method in accordance with the present invention contemplates removing or stripping a cured tire from both upper and lower sections or halves of a mold in a press for shaping and curing tires having a collapsible bladder. The method consists of a step of forming a gap between or spacing the upper bead of the cured tire and the upper circular bead of the bladder, a step of subsequently locating an arc of a plurality of sector segment plates expanded to a diameter exceeding the diameter of a bead of the tire in the gap formed in accordance with the preceding step, and the step of moving the segment plates upwardly integral with the upper clamping device for the upper bead of the bladder preferably in fixed relation with the upward movement of the upper half of the mold in order to displace upwardly the shaped and cured tire, the upper bead area of the tire being supported and/or arrested by the segment plates.

Apparatus for carrying out the method according to the invention is a device for stripping a cured tire from both upper and lower halves of a mold in a press for shaping and curing tires having a collapsible bladder and consisting of a center mechanism located centrally of the press and linked with segment plates expansible to a diameter exceeding the diameter of a bead of a tire and located on the upper clamping device for the upper bead of the bladder.

Other objects and a fuller understanding of the present invention may be had by referring to the following description and claims, taken in conjunction with the accompanying drawings.

DESCRIPTION OF THE PREFERRED EMBODIMENT

Figure 1:
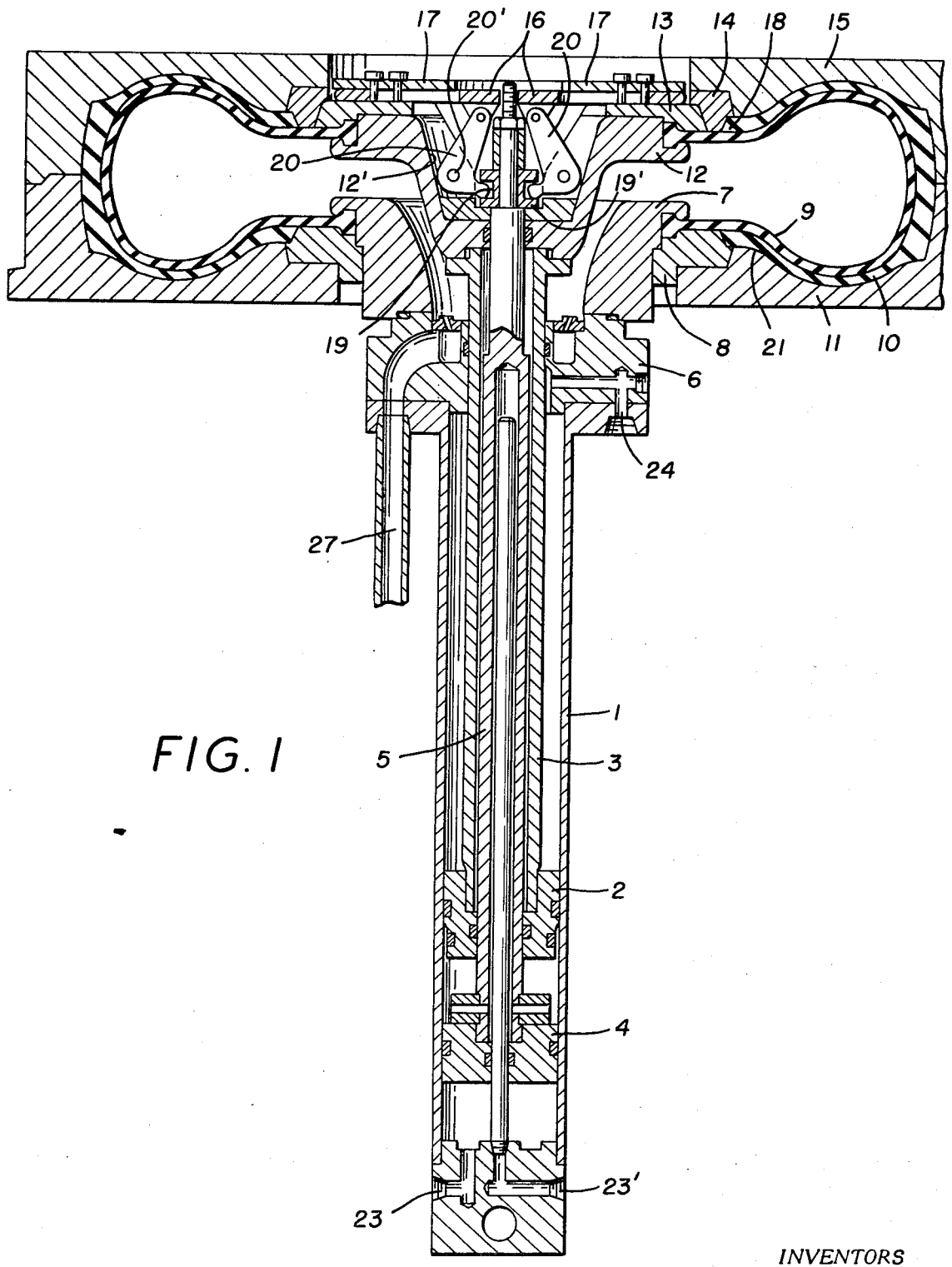
FIG. 1 is a lateral sectional view of a center mechanism, according to a preferred form of the present invention and adapted to carry out the method of the present invention, shown in operative relation to the mold parts in the course of shaping and curing a tire.

Referring now to the drawings and particularly FIG. 1, the center mechanism according to the present invention is composed of a vertical power cylinder 1, the upper half 2 of a piston assembly slidably installed in the power cylinder 1, a connecting rod 3 of the upper half 2 of the piston, a separate lower half 4 of the piston, likewise slidably installed in said power cylinder 1, and a piston rod 5 of said lower half 4 of the piston operatively connected to the segment plates 16. Both piston halves 2 and 4 are arranged for independent vertical movement, either upward or downward as the case may be, within the vertical power cylinder 1 caused by hydraulic fluid charged through the orifices 23, 23' and 24 in the power cylinder 1. The power cylinder 1 has a fixed cylinder top cover 6 to which is secured a lower clamp ring 7 which holds down the lower circular clamping bead of the collapsible bladder 9 against a concentrically located lower bead ring 8 supported by the lower half 11 of the mold. The upper circular bead of the bladder 9 is clamped by an upper clamping device, which may consist of a plate ring 12 and a clamp ring 13, connected with the top end of the connecting rod 3 of the upper half 2 of the power piston. The segment plates 16 are mounted for actuation on the top of said upper clamp ring 13, and particularly outside the bladder 9.

Figure 4:
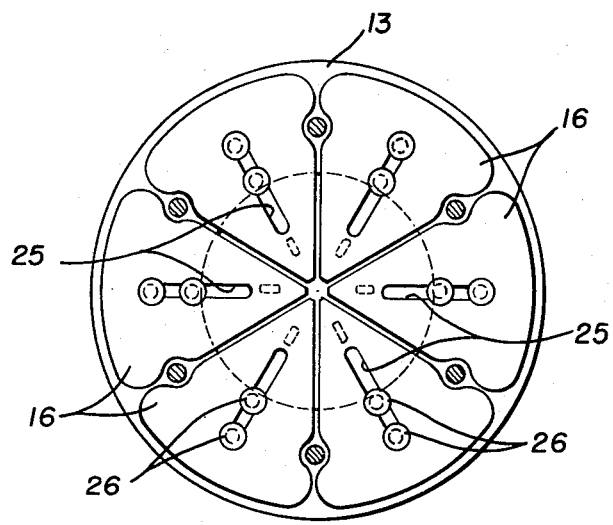
FIG. 4 is a plan view of the segment plates in the contracted position.
Figure 5:
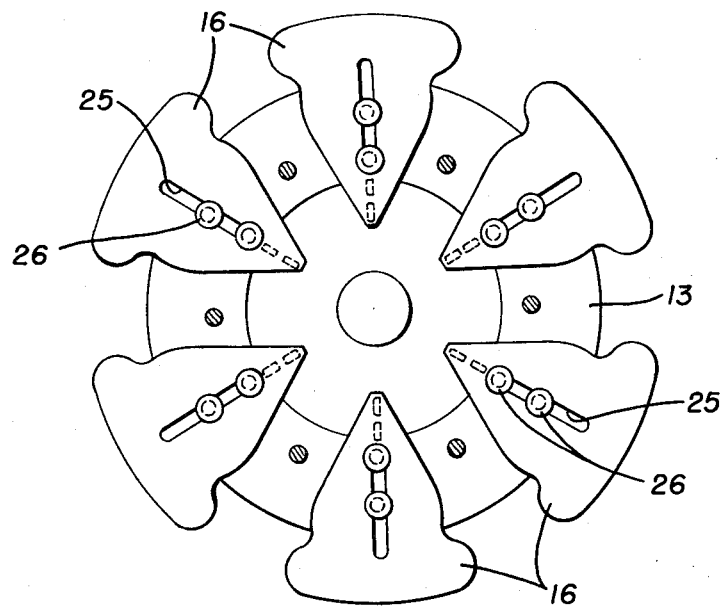
FIG. 5 is a plan view similar to FIG. 4 showing the segment plates in the expanded position.

As illustrated in detail in FIG. 4 and FIG. 5, there are a plurality of plates 16 substantially of sector shape with each individual segment plate 16 partially housed within the upper clamp ring 13 and supported thereby for free radial movement, either in and out or expanded and contracted. The underside of each individual segment plate 16 is engaged by the top of a drive cam 20 which is pivoted to the upper clamp ring 12 by a pin 20' and has a bottom thereof which engages a groove 19 of a sleeve 19' mounted on the top of the piston rod 5 of the lower half 4 of the piston which projects into a recess 12' in the upper clamping device, in order to provide the control of actuation of the segment plates 16 by movement of the connecting rod 3 relative to piston rod 5. Mounted atop the segment plates 16 is a hold down plate 17 having bolts 26 extending through slots 25 in segment plates 16 into clamp ring 13. Upper bead ring 14 is mounted on the upper half 15 of the mold to cooperatively engage the upper clamp ring 13 and is controlled, with respect to vertical movement, either upward or downward, by means of conventional press mechanism (not illustrated). Referring again to FIG. 1, the halves 15 and 11 of the mold are moved relative to each other in the operation of the press for shaping and curing the tire such that the upper and lower beads 18 and 21, respectively, of the tire 10 are clamped by both the upper and lower bead rings 14 and 8, respectively, the bladder 9, and both halves 11 and 15 of the mold. An orifice 27 is provided for the passage of the curing fluid charged into the bladder 9 through the cylinder top cover 6 and the lower clamp ring 7.

Operation for shaping and curing the tire and the control for stripping the cured tire in accordance with the embodiment of the present invention is discussed hereunder in conjunction with the various accompanying illustrations.

The charging of curing fluid into the bladder 9 from the lower half 11 of the mold through the orifice 27, with both halves 15 and 11 of the mold closed or brought into contact by the operation of the press results in shaping and curing of the tire 10 to hold the configuration of the bladder 9 and both halves 15 and 11 of the mold, by virtue of the heat and pressure applied thereto. During the process of tire shaping and curing, both halves 2 and 4 of the piston are positioned as illustrated in FIG. 1 with the segment plates 16 retracted in the space radially inwardly of the upper bead ring 14 and the upper half 15 of the mold and held immobile. Both the upper and lower circular beads of the bladder 9 are kept clamped between the upper plate ring 12 and clamp ring 13 and between clamp ring 7 and lower bead ring 8, respectively, as illustrated.

Figure 2:
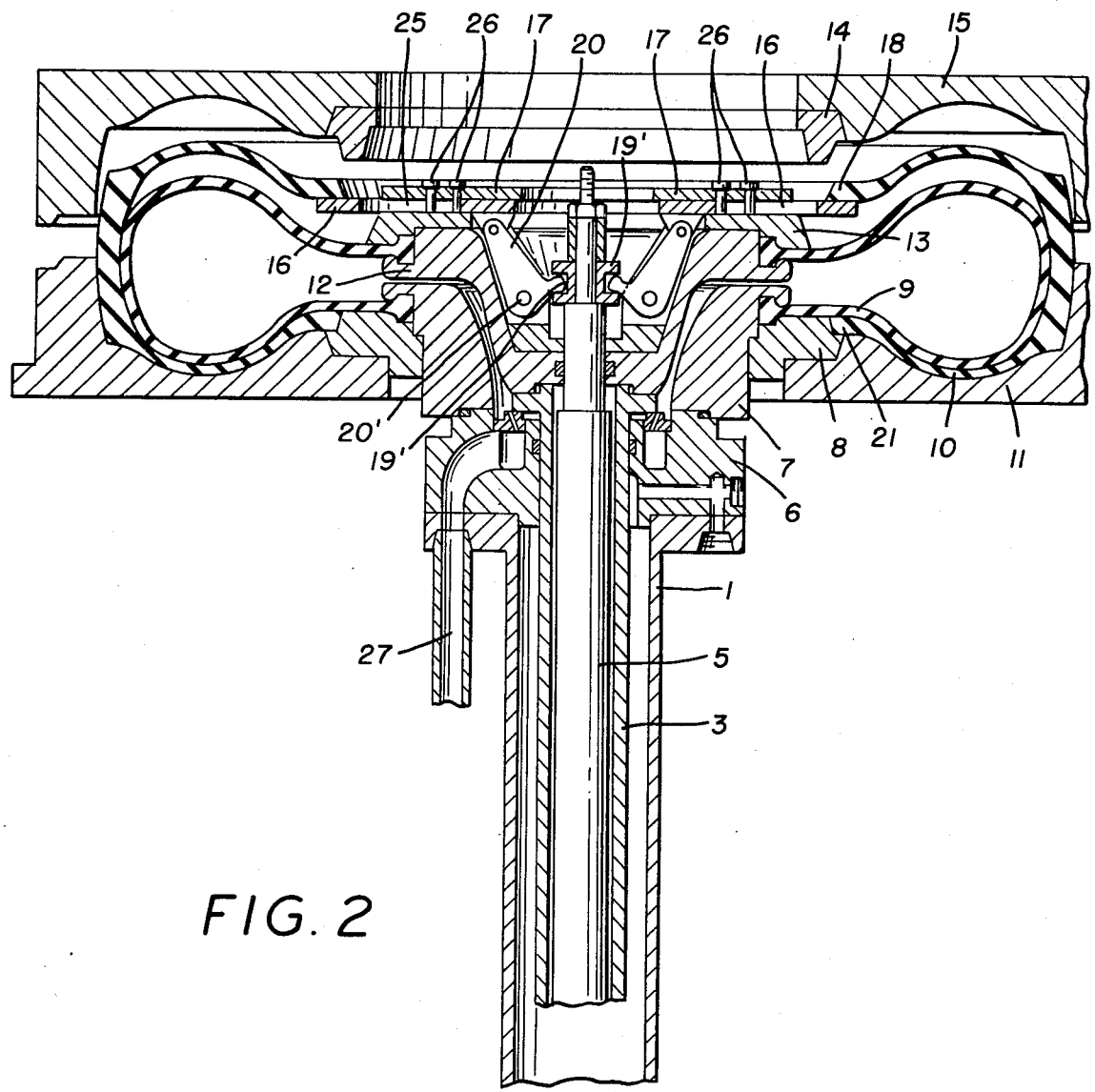
FIG. 2 is a lateral sectional view sequential to FIG. 1 of the center mechanism in relation to the mold, with the segment plates expanded.
Figure 3:
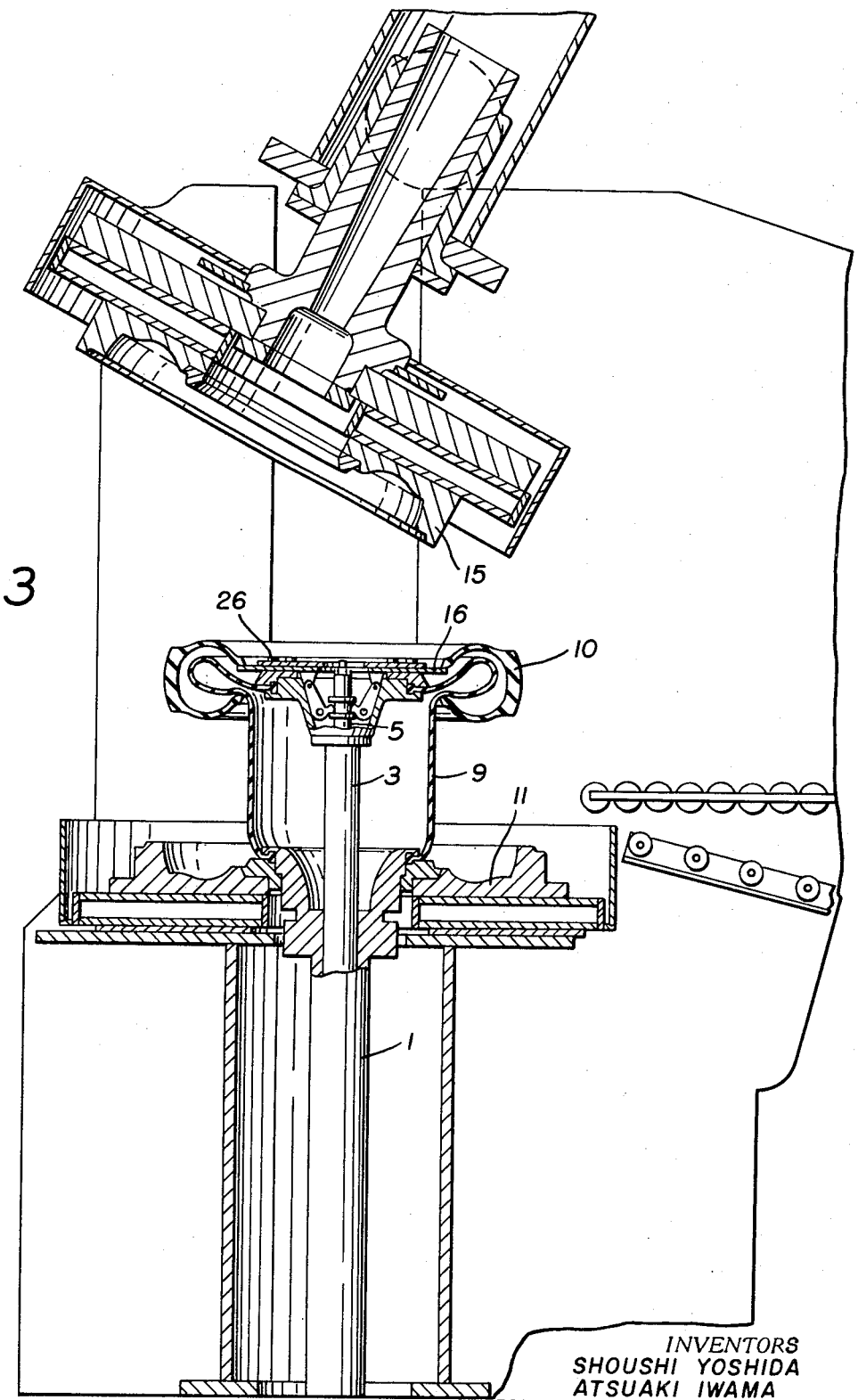
FIG. 3 is a schematic view sequential to FIG. 2 of the center mechanism combined with the mold, the cured tire having been shaped and cured and being supported by the expanded segment plates.

The shaping and curing of the tire having been completed under the conditions described above, the upper half 2 of the piston is then lowered with simultaneous downward movement of the connecting rod 3, resulting in lowering of the segment plates 16 which are carried by the upper plate ring 12 and clamp ring 13 that are attached to the connecting rod 3. While the press is being operated to open the mold, with the upper bead of the tire 10 maintained against the upper bead ring 14 of the upper half 15 of the mold, the piston rod 5 is moved upward relative to connecting rod 3, thereby giving rise to the simultaneous upward motion of the integral sleeve 19'. This in turn results in the drive cams 20 being pivoted relative to the upper plate ring 12 and causes all of individual segment plates 16 to be expanded from the position shown in FIG. 4 to the position of FIG. 5, thereby moving a portion thereof under the upper bead 18 of the tire, as illustrated in FIG. 2. Subsequently, the connecting rod 3 is moved upward, as shown in FIG. 3, causing the bladder 9 to be erected to strip the cured tire from the lower half 11 of the mold, the bladder 9 being stripped off the tire with the continued erection thereof. Once the bladder 9 is fully erected, the tire 10 is supported only by the expanded segment plates 16. Then, all the segment plates 16 are caused to be retracted again when the tire 10 is supported from underneath by suitable lifting arms, or similar type device (not shown), by independently lowering piston rod 5 relative to the connecting rod 3 to lower sleeve 19' and pivot the cams 20, whereby the tire 10 can be withdrawn from the center mechanism by the application of only a minimal force to the tire 10 by the lifting arms.

Should the tire 10 be displaced upward, due to sticking to the upper half 15 of the mold, in the course of press operation opening the mold, it would be positively stripped from the upper half 15 by the expanded segment plates 16 which would in such circumstance arrest the lower bead 21 of the tire 10.

Figure 6:
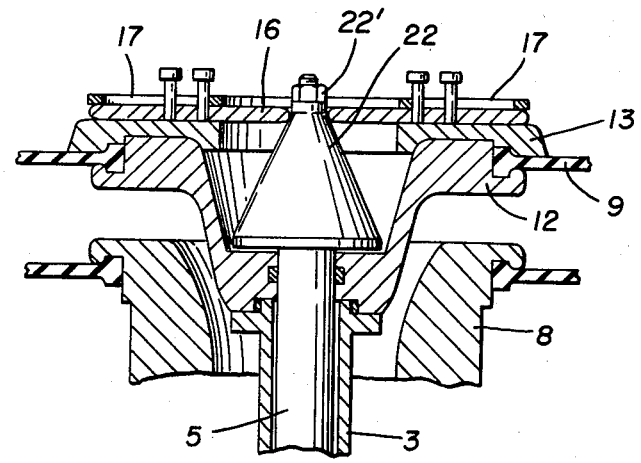
FIG. 6 is a fragmentary lateral sectional view of the detail of a center mechanism according to an alternative embodiment of the present invention with the segment plates in the contracted position.
Figure 7:
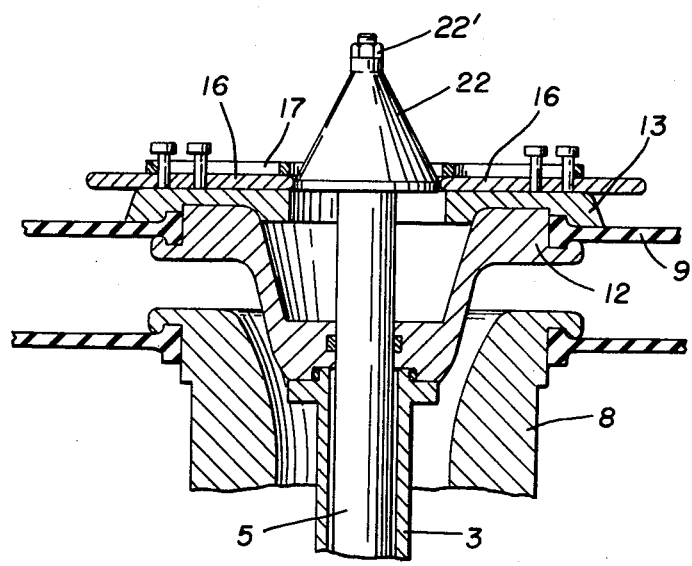
FIG. 7 is a fragmentary lateral sectional view of the detail of a center mechanism according to the embodiment of FIG. 6, with the segment plates in the expanded position.

As is apparent from the disclosure of the above embodiment of the present invention, expansion and retraction of the segment plates 16 may be produced by other elements such as the conical cam 22, illustrated in the alternative embodiment of FIG. 6 and FIG. 7, in place of the cam 20 and sleeve 19'. As seen in FIG. 6 and FIG. 7, respectively, the segment plates 16 are contracted and expanded by vertical motion of the conical cam 22 which may be removably attached, as by fastener 22' to the piston rod 5. It should be appreciated that the conical cam 22 may be installed either large diameter extremity down, as illustrated, or inverted with suitable modification in control to achieve the same result.

The present invention has been disclosed in detail hereinabove, and the positive stripping of the cured tire 10 is ensured by resorting to expansion of a plurality of segment plates 16 to a diameter larger than that of the bead of the tire 10, without the possibility of the tire sticking to either the upper 15 or lower 11 half of the mold. It should be noted that tire stripping with expansion of the segment plates can, according to the present invention, be realized quite smoothly, positively and quickly, because of the location of the segment plates 16 and the driving mechanism therefor exteriorly of and above the bladder 9 which removes the possibility of unstable performance or failure of operation of segment plates and/or driving mechanism therefor caused by the deterioration of the rubber in the bladder which is present with the location of the segment plates within the bladder.

Although the description has been made for the present invention with a degree of particularity requisite for understanding by persons skilled in the art, it is to be understood that the present disclosure has been made only by way of example and that numerous changes in the details of construction and the combination and arrangement of the parts or the details or sequence of steps may be resorted to without departing from the spirit and scope of the present invention as hereinafter claimed.

We claim:

1. A method of removing a cured tire from a press for shaping and curing tires having upper and lower mold sections and a collapsible bladder having upper and lower beads comprising the steps of, spacing the upper bead of the cured tire and the upper bead of the bladder while maintaining the bladder within the tire and while simultaneously vertically lowering a plurality of segment plates to a position lower than the upper bead of the tire and radially inwardly of the tire, then locating a portion of the plurality of segment plates into the space formed between the upper bead of the cured tire and the upper bead of the bladder by radially expanding the segment plates, and moving the segment plates upwardly while engaging the upper bead of the cured tire to strip the tire from the bladder and the mold sections.

2. A method according to claim 1, wherein the segment plates are expanded to an extent that the diameter of a portion thereof exceeds the diameter of the upper bead of the cured tire.

3. A method according to claim 1, wherein the segment plates are moved upwardly integral with the clamping device for the upper bead of the bladder.

4. A method according to claim 3, wherein the segment plates are moved upwardly with the upward movement of the upper mold section.

* * * * *